United States Patent
Honjo et al.

(10) Patent No.: US 11,566,307 B2
(45) Date of Patent: *Jan. 31, 2023

(54) RAIL

(71) Applicant: JFE STEEL CORPORATION, Tokyo (JP)

(72) Inventors: Minoru Honjo, Tokyo (JP); Mineyasu Takemasa, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/040,538

(22) PCT Filed: Mar. 25, 2019

(86) PCT No.: PCT/JP2019/012568
§ 371 (c)(1),
(2) Date: Sep. 23, 2020

(87) PCT Pub. No.: WO2019/189015
PCT Pub. Date: Oct. 3, 2019

(65) Prior Publication Data
US 2021/0269901 A1  Sep. 2, 2021

(30) Foreign Application Priority Data

Mar. 30, 2018 (JP) .............................. JP2018-068803

(51) Int. Cl.
*C22C 38/04* (2006.01)
*C21D 6/00* (2006.01)
(Continued)

(52) U.S. Cl.
CPC .............. *C22C 38/04* (2013.01); *C21D 6/002* (2013.01); *C21D 9/04* (2013.01); *C22C 38/002* (2013.01);
(Continued)

(58) Field of Classification Search
None
See application file for complete search history.

(56) References Cited

U.S. PATENT DOCUMENTS 4,375,995 A * 3/1983 Sugino ..................... C21D 9/04
148/584
7,955,445 B2 6/2011 Honjo et al.
(Continued)

FOREIGN PATENT DOCUMENTS

| CN | 101646795 A | 2/2010 |
|---|---|---|
| CN | 101743334 A | 6/2010 |

(Continued)

OTHER PUBLICATIONS

Machine translation of JP 2016156071 A from Espacenet (translated Sep. 30, 2021) (Year: 2016).*

(Continued)

*Primary Examiner* — Elizabeth Collister
(74) *Attorney, Agent, or Firm* — Kenja IP Law PC

(57) ABSTRACT

Provided is a rail that is effective in improving wear resistance and rolling contact fatigue (RCF) resistance. The rail has a metallic structure including a pearlitic structure and a structure other than the pearlitic structure in a surface layer from a surface of a rail head to a depth of at least 0.5 mm, where the pearlitic structure has Vickers hardness of 420 HV or more and 520 HV or less, and the structure other than the pearlitic structure has Vickers hardness of 350 HV or more and 420 HV or less.

3 Claims, 5 Drawing Sheets

(51) Int. Cl.
  *C21D 9/04* (2006.01)
  *C22C 38/00* (2006.01)
  *C22C 38/02* (2006.01)
  *E01B 5/08* (2006.01)

(52) U.S. Cl.
  CPC .............. *C22C 38/02* (2013.01); *E01B 5/08* (2013.01); *C21D 2211/009* (2013.01)

(56) References Cited

U.S. PATENT DOCUMENTS

| | | |
|---|---|---|
| 8,361,246 B2 | 1/2013 | Ueda et al. |
| 8,747,576 B2 | 6/2014 | Miyazaki et al. |
| 8,980,019 B2 | 3/2015 | Ueda et al. |
| 9,127,409 B2 | 9/2015 | Ueda et al. |
| 10,047,411 B2 | 8/2018 | Ueda et al. |
| 10,253,397 B2 | 4/2019 | Kimura et al. |
| 10,494,704 B2 | 12/2019 | Ueda et al. |
| 10,563,357 B2 | 2/2020 | Ueda et al. |
| 2010/0116381 A1 | 5/2010 | Honjo et al. |
| 2010/0186857 A1 | 7/2010 | Honjo et al. |
| 2011/0303756 A1* | 12/2011 | Ueda ............... C22C 38/005 238/150 |
| 2013/0065079 A1 | 3/2013 | Ueda et al. |
| 2015/0136864 A1* | 5/2015 | Ueda ............... C22C 38/06 238/150 |
| 2015/0322553 A1 | 11/2015 | Han et al. |
| 2016/0083820 A1 | 3/2016 | Kimura et al. |
| 2016/0194729 A1 | 7/2016 | Deng et al. |
| 2017/0051373 A1 | 2/2017 | Ueda et al. |
| 2017/0101692 A1 | 4/2017 | Kimura et al. |
| 2017/0369975 A1 | 12/2017 | Ueda et al. |

FOREIGN PATENT DOCUMENTS

| | | |
|---|---|---|
| CN | 102203311 A | 9/2011 |
| CN | 102985574 A | 3/2013 |
| CN | 103966520 A | 8/2014 |
| CN | 104185690 A | 12/2014 |
| CN | 104561816 A | 4/2015 |
| CN | 105051220 A | 11/2015 |
| CN | 107208216 A | 9/2017 |
| CN | 107208217 A | 9/2017 |
| EP | 2135966 A1 | 12/2009 |
| JP | 2000345296 A | 12/2000 |
| JP | 2002363698 A | 12/2002 |
| JP | 2004223531 A | 8/2004 |
| JP | 2010077481 A | 4/2010 |
| JP | 4805414 B2 | 11/2011 |
| JP | 4938158 B2 | 5/2012 |
| JP | 2016156071 A * | 9/2016 |
| WO | 2011155481 A1 | 12/2011 |
| WO | 2015182759 A1 | 12/2015 |

OTHER PUBLICATIONS

May 31, 2021, Office Action issued by the China National Intellectual Property Administration in the corresponding Chinese Patent Application No. 201980022202.7 with English language search report.

Apr. 9, 2021, the Extended European Search Report issued by the European Patent Office in the corresponding European Patent Application No. 19775316.3.

Jun. 11, 2019, International Search Report issued in the International Patent Application No. PCT/JP2019/012568.

May 27, 2021, Office Action issued by the IP Australia in the corresponding Australian Patent Application No. 2019242777.

Sep. 22, 2021, Office Action issued by the Canadian Intellectual Property Office in the corresponding Canadian Patent Application No. 3,095,559.

Mar. 4, 2022, Office Action issued by the China National Intellectual Property Administration in the corresponding Chinese Patent Application No. 201980022202.7 with English language search report.

Jul. 7, 2022, Office Action issued by the China National Intellectual Property Administration in the corresponding Chinese Patent Application No. 201980022202.7 with English language concise statement of relevance.

* cited by examiner

RAIL

TECHNICAL FIELD

This disclosure relates to a rail used under harsh high-axle load conditions, such as under a condition where a heavy freight car travels on a track with many sharp curves. The disclosure particularly relates to a rail having excellent wear resistance and rolling contact fatigue (RCF) resistance suitable for a long service life.

BACKGROUND

In heavy haul railways mainly built to transport ore, the load applied to the axle of a freight car is much higher than that of passenger cars, and rails and wheels are used in increasingly harsh environments. Such a heavy haul railway, that is, a rail used in a railway for trains or freight cars having a heavy loading weight, is conventionally mainly made of steel having a pearlitic structure from the viewpoint of attaching importance to wear resistance and RCF resistance. In recent years, it has been required to further improve the wear resistance and the RCF resistance of the rail to increase the loading weight on a freight car and improve the transportation efficiency.

Therefore, various studies have been conducted with the aim of further improving wear resistance and RCF resistance. For example, JP 4805414 B (PTL 1) proposes a rail having excellent RCF resistance, in which the chemical composition, the structure (microstructure) of the rail head surface and the rail bottom surface and the fraction of the structure, the hardness of the pearlitic structure part, and the surface roughness are respectively specified. JP 4938158 B (PTL 2) proposes a rail having excellent RCF resistance, in which the chemical composition, the structure of the rail head surface and the fraction of the structure, the hardness of the pearlitic structure part, and the concentration of Mn are respectively specified.

CITATION LIST

Patent Literature

PTL 1: JP 4805414 B
PTL 2: JP 4938158 B

SUMMARY

Technical Problem

When a train passes through a newly-installed rail, the rail comes into contact with the worn wheels of the train. Therefore, depending on the contact state, a fatigue layer may be accumulated in the rail surface layer, cracks may occur on the rail surface in an early stage just after the installing of the rail, and shelling may occur on the rail surface layer as cracks propagate and connect together. As a result, the service life of the rail is reduced.

Therefore, in an early stage just after the installing of the rail, the rail should fit to the wheels. As illustrated in FIG. 1, the early stage targets a surface layer 2 from a head surface of a rail 1 to a depth of at least 0.5 mm. The depth of 0.5 mm is a position separated from the head surface of the rail by 0.5 mm in the normal direction. When the structure of the surface layer is only a pearlitic structure, wear of the rail is reduced, yet a fatigue layer is accumulated and cracks (for example, head checks) occur. If the rail is still used even after occurrence of cracks, the cracks propagate and connect together and eventually lead to occurrence of shelling. Therefore, it is necessary to suppress cracks by other methods than utilizing pearlitic structure.

However, both of the techniques described in the above PTLS 1 and 2 are techniques of improving the RCF resistance without deteriorating the wear resistance of a rail by specifying the chemical composition as well as the fraction of a pearlitic structure of the rail head and the hardness of the pearlitic structure, which do not take it into consideration to suppress occurrence of cracks in an early stage just after the installing of the rail.

That is, the techniques described in the above PTLS 1 and 2 specify the fraction of a pearlitic structure and the hardness of the pearlitic structure. However, wear resistance and RCF resistance are not simply determined by the hardness of a pearlitic structure, and the influence of structures other than the pearlitic structure should also be taken into consideration. The RCF resistance cannot be sufficiently improved by specifying the fraction of a pearlitic structure and the hardness of pearlite within that range.

It could thus be helpful to provide a way of improving the RCF resistance without deteriorating the wear resistance of a rail.

Solution to Problem

As a result of studies to solve the above problem, we discovered that the RCF resistance can be improved without deteriorating the wear resistance of a rail by, in addition to specifying the hardness of a pearlitic structure in a surface layer of the rail, including a structure having specified hardness other than the pearlitic structure in the surface layer of the rail, and completed the present disclosure.

The present disclosure is based on the aforementioned discoveries. We thus provide the following.

1. A rail comprising a metallic structure including a pearlitic structure and a structure other than the pearlitic structure in a surface layer from a surface of a rail head to a depth of at least 0.5 mm, wherein the pearlitic structure has Vickers hardness of 420 HV or more and 520 HV or less, and the structure other than the pearlitic structure has Vickers hardness of 350 HV or more and 420 HV or less.

2. The rail according to 1., comprising a chemical composition containing (consisting of), in mass %:
   C: 0.60% to 1.00%,
   Si: 0.10% to 1.50%,
   Mn: 0.10% to 1.50%,
   P: 0.025% or less,
   S: 0.010% or less, and
   Cr: 0.10% to 1.50%,
   the balance being Fe and inevitable impurities.

3. The rail according to 2., wherein the chemical composition further contains, in mass %, at least one selected from the group consisting of:
   V: 0.30% or less,
   Cu: 1.0% or less,
   Ni: 1.0% or less,
   Nb: 0.05% or less,
   Mo: 0.5% or less,
   Al: 0.07% or less,
   W: 1.0% or less,
   Sb: 0.1% or less,
   Sn: 0.1% or less,
   B: 0.005% or less, and
   Ti: 0.05% or less.

4. The rail according to any one of 1. to 3., wherein an area fraction of the structure other than the pearlitic structure in the surface layer is more than 3%.

Advantageous Effect

According to the present disclosure, it is possible to provide a rail which is excellent in wear resistance and RCF resistance and can be suitably used even in high-axle load railways.

DETAILED DESCRIPTION

Figure 1:
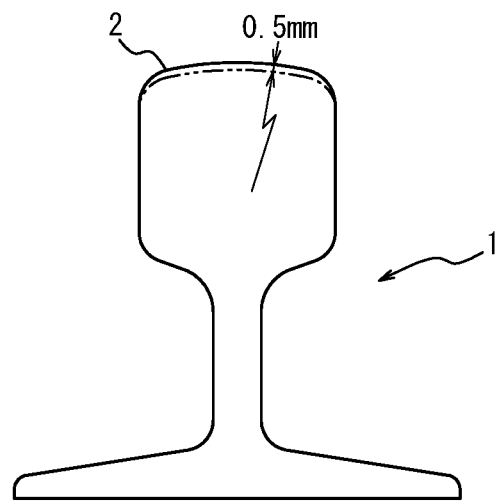
FIG. 1 is a schematic view of the rail.

The following describes the rail of the present disclosure in detail. It is important for the rail of the present disclosure to have a metallic structure including a pearlitic structure and a structure other than the pearlitic structure in a surface layer from a surface of a rail head to a depth of at least 0.5 mm, where the pearlitic structure has Vickers hardness of 420 HV or more and 520 HV or less, and the structure other than the pearlitic structure has Vickers hardness of 350 HV or more and 420 HV or less.

To improve the fitting of the rail to wheels to avoid the occurrence of cracks in an early stage just after the installing of the rail, it is necessary to improve the fitting of the surface layer to wheels, where the surface layer is a region to a depth of at least 0.5 mm.

As used herein, fitting to wheels means that the shape of the newly-installed rail follows close to the shape of the wheels passing on the rail. If only the hardness of the pearlitic structure is increased to ensure wear resistance as in the past, a fatigue layer is accumulated in the rail surface layer before the rail obtains a shape close to the abovementioned wheel shape, and cracks such as head checks or gauge corner shelling are likely to occur. As a result, the RCF resistance is deteriorated. Therefore, by mixing another structure that is less wear resistant than the pearlitic structure, the surface layer of the rail wears out to fit the rail to the wheels, and the RCF resistance is ensured by the wearing. However, even in the case of having a structure other than pearlite, if the hardness is too low, the wear resistance is rather deteriorated. On the other hand, if the hardness is too high, the progress of wearing is slowed down, which, on the contrary, tends to deteriorate the RCF resistance. Therefore, it is necessary to control not only the structure (microstructure) but also the hardness of the structure.

That is, when the surface layer in which the hardness of the structure is controlled is shallower than a depth of 0.5 mm from the head surface of the rail, the fitting to the wheels cannot be ensured. Note that the surface layer in which the hardness of the structure is controlled does not have to be very deep. From the viewpoint of fitting the rail to the shape of the wheels, it is enough to have the microstructure and the hardness in a region to a depth of 3 mm satisfy the conditions of the present disclosure. From the viewpoint of the wear resistance of the rail, it is preferable to suppress the surface layer in which the hardness of the structure is controlled to a depth range of 3 mm or less.

The reason why the structure of the surface layer includes a pearlitic structure and a structure other than the pearlitic structure is that, in the case of a single-phase structure of pearlite, although the wear resistance is good when the surface layer is in contact with the wheels, the stress is not dispersed when the rail is in contact with the wheels and a layer in which fatigue is accumulated is formed in the surface layer, and cracks are likely to occur in an early stage just after the installing of the rail. That is, by including a structure other than the pearlitic structure, stress can be dispersed when the rail is in contact with the wheels and the accumulation of fatigue is suppressed. As a result, the occurrence of cracks can be prevented.

The rail of the present disclosure has a surface layer having a metallic structure including a pearlitic structure and a structure other than the pearlitic structure from a surface of the rail head to a depth of at least 0.5 mm. In the surface layer, the area fraction of the structure other than the pearlitic structure is preferably more than 3%. When the area fraction of the structure is 3% or less, the fraction of pearlite increases, the wear resistance is ensured, a fatigue layer is accumulated in the rail surface layer before the rail fits to a shape close to the abovementioned shape, cracks such as head checks are likely to occur. As a result, the RCF resistance is likely to be deteriorated. Therefore, the area fraction of the structure other than the pearlitic structure is preferably more than 3%.

Because the pearlitic structure and the structure other than the pearlitic structure can be identified by color tone, they can be identified through structure observation, for example. In addition, the boundary between the surface layer portion and other portions of the rail can also be determined through the structure observation. Further, the area fractions of the pearlitic structure and the structure other than the pearlitic structure in the surface layer can be obtained by calculating the respective areas of the pearlitic structure and the structure other than the pearlitic structure from the result of the determination.

Further, the reasons for limiting the hardness of the pearlitic structure to 420 HV or more and 520 HV or less and limiting the hardness of the structure other than the pearlitic structure to 350 HV or more and 420 HV or less are as follows. When the hardness of the pearlitic structure is less than 420 HV and/or the hardness of the structure other than the pearlitic structure is less than 350 HV, it is difficult to ensure the wear resistance of the rail. On the other hand, when the hardness of the pearlitic structure exceeds 520 HV and/or the hardness of the structure other than the pearlitic structure exceeds 420 HV, the wear resistance can be ensured, yet on the other hand, the stress dispersion is insufficient and cracks are likely to occur in the rail. Therefore, the hardness of the pearlitic structure is 420 HV or more and preferably 425 HV or more, and the hardness of the pearlitic structure is 520 HV or less and preferably 515 HV or less. Further, the hardness of the structure other than the pearlitic structure is 350 HV or more and preferably 355

HV or more, and the hardness of the structure other than the pearlitic structure is 420 HV or less and preferably 419 HV or less.

The hardness of each structure can be measured, for example, according to the following method. That is, as described above, the pearlitic structure and the structure other than pearlite are identified through the structure observation, and then the hardness can be measured in the respective regions of the specified pearlitic structure and the structure other than pearlite.

As used herein, the structure other than the pearlitic structure may be any of ferrite, bainite, martensite, and tempered martensite. From the viewpoint of ensuring RCF resistance, bainite is preferable. Further, the structure of portions other than the surface layer of the rail, that is, the structure in a region deeper than the surface layer, which is a region from the head surface of the rail until a depth of 0.5 mm up to a maximum depth of 3 mm, is preferably a pearlitic structure.

As described above, the rail of the present disclosure improves the RCF resistance without deteriorating the wear resistance by appropriately specifying the respective hardness of the pearlitic structure and the structure other than the pearlitic structure in the surface layer. The chemical composition is not particularly limited as long as it is a chemical composition capable of obtaining a pearlitic structure. The following chemical composition is suitable for a rail used under high-axle load conditions.

[Chemical Composition]

Next, the reasons for limiting the content of each component of the preferred chemical composition of the rail of the present disclosure will be explained. Note that "%" indicating the content of each component is "mass %", unless otherwise stated.

C: 0.60% or More and 1.00% or Less

C is an element having the effect of forming cementite in the pearlitic structure to improve the hardness. Therefore, it is necessary to add C to ensure the wear resistance and the RCF resistance of the rail, and the hardness improves as the C content increases. That is, when the C content is less than 0.60%, the hardness decreases. As a result, the wear resistance of the rail is likely to be deteriorated. Therefore, the C content is preferably 0.60% or more and more preferably 0.62% or more. On the other hand, when the C content exceeds 1.00%, the hardness of the rail increases. As a result, the wear resistance is improved, yet a fatigue layer is accumulated and the RCF resistance of the rail is deteriorated. Therefore, the C content is preferably 1.00% or less and more preferably 0.95% or less.

Si: 0.10% or More and 1.50% or Less

Si is an element having the effect as a deoxidation agent. In addition, Si has the effect of improving the hardness of the rail through the solution strengthening to ferrite in pearlite. Therefore, the Si content is preferably 0.10% or more and more preferably 0.15% or more. On the other hand, when the Si content exceeds 1.5%, a large amount of oxide inclusions is formed since Si strongly binds with oxygen. As a result, the RCF resistance is deteriorated. Therefore, the Si content is preferably 1.50% or less.

Mn: 0.10% or More and 1.50% or Less

Mn is an element that improves the hardness of the rail by lowering the transformation temperature and reducing the lamellar spacing. However, when the Mn content is less than 0.10%, the effect is insufficient. Therefore, the Mn content is preferably 0.10% or more and more preferably 0.15% or more. On the other hand, when the Mn content exceeds 1.50%, micro segregation of the steel with a high Mn concentration likely to cause formation of a martensitic structure. As a result, the RCF resistance is deteriorated. Therefore, the Mn content is preferably 1.50% or less.

P: 0.025% or Less

When the P content exceeds 0.025%, the ductility of the rail decreases. Therefore, the P content is preferably 0.025% or less. On the other hand, the lower limit of the P content is not particularly limited and may be 0%, yet it is usually more than 0% in industrial terms. Note that excessive reduction of the P content causes an increase in refining cost. Therefore, from the viewpoint of economic efficiency, the P content is preferably 0.001% or more.

S: 0.010% or Less

S is mainly present in steel in the form of A type (sulfide) inclusions. When the S content exceeds 0.010%, the amount of the inclusions is significantly increased, and coarse inclusions are formed. As a result, the RCF resistance is deteriorated. Therefore, the S content is preferably 0.010% or less and more preferably 0.009% or less. On the other hand, the lower limit of the S content is not particularly limited and may be 0%, yet it is usually more than 0% in industrial terms. Note that when the S content is less than 0.0005%, the refining cost increases. Therefore, from the viewpoint of economic efficiency, the S content is preferably 0.0005% or more.

Cr: 0.10% or More and 1.50% or Less

Cr is an element that has the effect of improving the hardness of the rail through the solution strengthening to cementite in pearlite. To obtain this effect, the Cr content is preferably 0.10% or more and more preferably 0.15% or more. On the other hand, when the Cr content exceeds 1.50%, a martensitic structure is formed because of the solution strengthening of Cr. As a result, the RCF resistance is deteriorated. Therefore, the Cr content is preferably 1.50% or less.

The steel material of the rail of the present disclosure preferably contains the above components, and the balance is preferably Fe and inevitable impurities. Further, the following elements may be added as necessary within a range not substantially affecting the action and effect of the present disclosure.

That is, it is possible to further contain at least one selected from the group consisting of the following elements as necessary:

V: 0.30% or less,
Cu: 1.0% or less,
Ni: 1.0% or less,
Nb: 0.05% or less,
Mo: 0.5% or less,
Al: 0.07% or less,
W: 1.0% or less,
Sb: 0.1% or less,
Sn: 0.1% or less,
B: 0.005% or less, and
Ti: 0.05% or less.

The reasons for limiting the content of each component are as follows.

V: 0.30% or Less

V is an element that precipitates as carbonitrides during and after rolling and has the effect of improving the hardness of the rail through precipitation strengthening. Therefore, it is preferable to add V in an amount of 0.001% or more. On the other hand, when the V content exceeds 0.30%, a large amount of coarse carbonitrides precipitates, which causes deterioration in RCF resistance. Therefore, in the case of adding V, the V content is preferably 0.30% or less.

Cu: 1.0% or Less

Cu, like Cr, is an element having the effect of improving the hardness of the rail through solution strengthening. Therefore, it is preferable to add Cu in an amount of 0.001% or more. On the other hand, when the Cu content exceeds 1.0%, Cu cracking occurs. Therefore, in the case of adding Cu, the Cu content is preferably 1.0% or less.

Ni: 1.0% or Less

Ni has the effect of improving the hardness of the rail without deteriorating the ductility. Therefore, it is preferable to add Ni in an amount of 0.001% or more. Further, since Cu cracking can be suppressed by adding Ni in combination with Cu, it is desirable to also add Ni in the case of adding Cu. On the other hand, when the Ni content exceeds 1.0%, the quench hardenability is increased and martensite is formed, resulting in deterioration in RCF resistance. Therefore, in the case of adding Ni, the Ni content is preferably 1.0% or less.

Nb: 0.05% or Less

Nb precipitates as carbonitrides during and after rolling to improve the hardness of the rail. Therefore, it is preferable to add Nb in an amount of 0.001% or more. On the other hand, when the Nb content exceeds 0.05%, a large amount of coarse carbonitrides precipitates, which decreases the ductility. Therefore, in the case of adding Nb, the Nb content is preferably 0.05% or less.

Mo: 0.5% or Less

Mo precipitates as carbides during and after rolling and improves the hardness of the rail through precipitation strengthening. Therefore, it is preferable to add Mo in an amount of 0.001% or more. On the other hand, when the Mo content exceeds 0.5%, martensite is formed, resulting in deterioration in RCF resistance. Therefore, in the case of adding Mo, the Mo content is preferably 0.5% or less.

Al: 0.07% or Less

Al is an element added as a deoxidation agent. Therefore, it is preferable to add Al in an amount of 0.001% or more. On the other hand, when the Al content exceeds 0.07%, a large amount of oxide inclusions is formed since Al strongly binds with oxygen. As a result, the RCF resistance is deteriorated. Therefore, the Al content is preferably 0.07% or less.

W: 1.0% or Less

W precipitates as carbides during and after rolling and improves the hardness of the rail through precipitation strengthening. Therefore, it is preferable to add W in an amount of 0.001% or more. On the other hand, when the W content exceeds 1.0%, martensite is formed, resulting in deterioration in RCF resistance. Therefore, in the case of adding W, the W content is preferably 1.0% or less.

Sb: 0.1% or Less

Sb is an element which, when reheating a steel material of a rail in a heating furnace, prevents decarburization during the reheating, prevents a decrease in the amount of cementite in a pearlitic structure, and contributes to the improvement of hardness. Therefore, it is preferable to add Sb in an amount of 0.001% or more. On the other hand, when Sb is added in an amount exceeding 0.1%, the Sb concentrates at austenite grain boundaries during heating, and cracking occurs. Therefore, in the case of adding Sb, the Sb is preferably added in an amount of 0.1% or less.

Sn: 0.1% or Less

Sb is an element which, when reheating a steel material of a rail in a heating furnace, prevents decarburization during the reheating, prevents a decrease in the amount of cementite in a pearlitic structure, and contributes to the improvement of hardness. Therefore, it is preferable to add Sn in an amount of 0.001% or more. On the other hand, when Sn is added in an amount exceeding 0.1%, the Sn concentrates at austenite grain boundaries during heating, and cracking occurs. Therefore, in the case of adding Sn, the Sn content is preferably 0.1% or less.

B: 0.005% or Less

B precipitates as nitrides during and after rolling and improves the hardness of the rail through precipitation strengthening. Therefore, it is preferable to add B in an amount of 0.0001% or more. However, when the B content exceeds 0.005%, martensite is formed, resulting in deterioration in RCF resistance. Therefore, in the case of adding B, the B content is preferably 0.005% or less.

Ti: 0.05% or Less

Ti precipitates as carbides, nitrides or carbonitrides during and after rolling and improves the hardness of the rail through precipitation strengthening. Therefore, it is preferable to add Ti in an amount of 0.001% or more. However, when the Ti content exceeds 0.05%, coarse carbides, nitrides or carbonitrides are formed, resulting in deterioration in RCF resistance. Therefore, in the case of adding Ti, the Ti content is preferably 0.05% or less.

[Manufacturing Conditions]

The rail of the present disclosure can be manufactured by performing hot rolling and then cooling according to a usual method. For example, it is preferable to apply the following manufacturing conditions. That is, it is preferable to reheat a continuously-cast bloom at a reheating temperature of 1000° C. or higher and 1350° C. or lower for 3600 seconds or longer, and subject the bloom to hot rolling and then cooling. In the cooling, it is preferable to perform cooling at a cooling rate of 2° C./s or higher and 10° C./s or lower from a temperature region of 700° C. or higher (first cooling treatment), hold the bloom at a temperature region of 460° C. or higher and 600° C. or lower for 5 seconds or longer and 60 seconds or shorter (first holding) during the cooling, then perform cooling at a cooling rate of 1° C./s or higher and 7° C./s or lower (second cooling treatment), and hold the bloom at a temperature region of 350° C. or higher and 450° C. or lower for 60 seconds or longer (second holding). The cooling method thereafter is not particularly limited, and the bloom may be allowed to be naturally cooled, for example.

The cooling treatment will be described with a specific example. For example, in the case where a 136-pound rail defined by AREMA (American Railway Engineering and Maintenance-of-Way Association) is manufactured by performing smelting to obtain a steel having the chemical composition of A2 steel listed in Table 1 described later, subjecting the steel to continuous casting to obtain a continuous-cast steel, and subjecting the continuous-cast steel to hot rolling and cooling, the cooling conditions in this case are as follows.

Cooling start temperature: 750° C.
First cooling rate: 5° C./s
First holding temperature: 550° C.
First holding time: 20 seconds
Second cooling rate: 2° C./s
Second holding temperature: 430° C.
Second holding time: 300 seconds Microstructure observation and hardness measurement of the rail thus manufactured were performed with the method described below. It was confirmed that, the region from the surface of the rail head to a depth of 1 mm had a pearlitic structure and a structure other than the pearlitic structure (in this case, it was bainitic structure), and the fraction of the structure other than the pearlitic structure was 5%. It was also confirmed that the hardness of the pearlitic structure was HV450 at the maximum and HV434 at the minimum, and the hardness of the structure other than the pearlitic structure was HV380 at the maximum and HV360 at the minimum. That is, the rail of the present disclosure can be manufactured according to the above manufacturing conditions in the actual rail manufacture. Although it is preferable to manufacture rails with the above manufacturing process and actually install the rails for evaluation in the following Examples, it takes too much time. Therefore, in the present disclosure, the rail performance is evaluated by changing the microstructure and the hardness in a laboratory.

EXAMPLES

Example 1

It takes too much time to manufacture rails and then install the rails to evaluate their properties. Therefore, in the present example, a rail steel material was manufactured with the following method, and a test piece was obtained from the rail steel material and subjected to evaluation.

Figure 2:
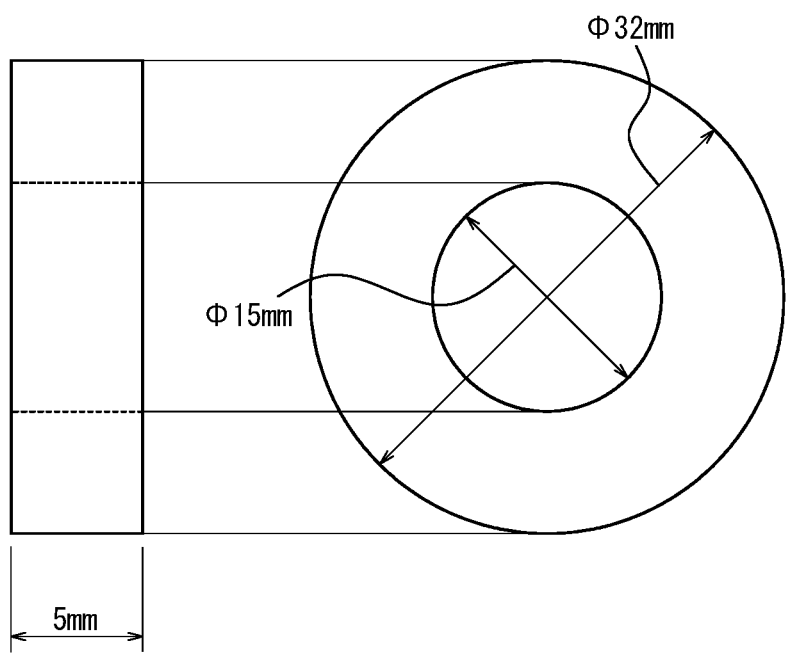
FIG. 2 is a schematic view of a test piece to be subjected to heat treatment.

That is, 100 kg of rail steel having the chemical composition listed in Table 1 was refined by vacuum melting and then cast, followed by hot-rolling to 80 mm thickness. Further, the rolled material was cut into a length of 150 mm, then heated to 1000° C. to 1300° C., hot-rolled to a final plate thickness of 12 mm, and then allowed to be cooled. A disk test piece having a diameter of 32 mm and a thickness of 5 mm as illustrated in FIG. 2 was obtained from the obtained rail steel material. Next, the obtained disk test piece was subjected to heat treatment according to the conditions listed in Table 2. That is, first, the disk test piece was heated and then naturally cooled, and from a predetermined cooling start temperature, the test piece was cooled at a first cooling rate higher than the rate of natural cooling. Next, the cooling was stopped when the test piece reached a predetermined first holding temperature, and the test piece was held at the predetermined first holding temperature just for predetermined holding time.

After being held at the first holding temperature, the test piece was cooled at a second cooling rate higher than the rate of natural cooling. The cooling was stopped when the test piece reached a predetermined second holding temperature, and the test piece was held at the predetermined second holding temperature just for predetermined holding time. After being held at the second holding temperature, the test piece was naturally cooled. After the heat treatment, it was machined to the test piece illustrated in FIG. 3.

Because the test piece of the present example was manufactured in a laboratory, the size of the manufactured steel material was different from that of the steel material manufactured with an actual manufacturing facility, and the heat capacity of the steel material was also greatly different from that of the steel material manufactured with an actual manufacturing facility. Therefore, regardless of whether or not the conditions of the present example corresponded to the aforementioned preferable manufacturing conditions for an actual manufacturing facility, the present example appropriately adjusted the heat treatment conditions to manufacture test materials having various microstructures and hardness, and mainly the structure of the surface layer of the test materials were compared and evaluated.

For the test piece thus obtained, the region corresponding to the surface layer was specified as described later, and the hardness of each structure in that region was measured as described later. At the same time, the wear resistance and the RCF resistance of each test piece was evaluated with the test methods described later. The evaluation results are listed in Table 3.

(Wear Resistance and RCF Resistance)

As described above, it is most desirable to actually install and use a rail to evaluate its wear resistance and RCF resistance, yet the test takes too much time. Therefore, the present disclosure used a twin disc type rolling contact test machine, with which the wear resistance and the RCF resistance could be evaluated in a short period of time, and performed a comparing test, in which the actual contacting conditions between a rail and a wheel were simulated, to evaluate the wear resistance and the RCF resistance. Note that the wheel material used in both wear resistance and RCF resistance tests was a wheel having a pearlitic structure and a hardness of 370 HV.

Figure 3:
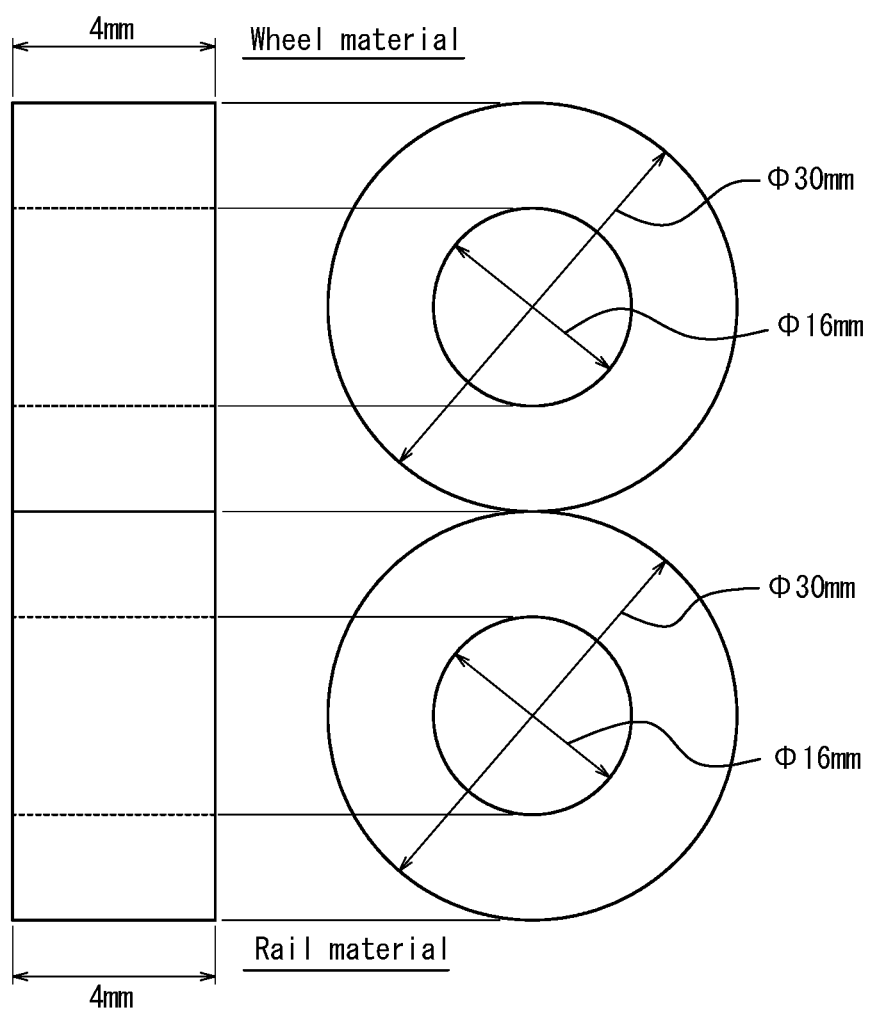
FIG. 3 schematically illustrates a test piece for wear resistance evaluation and the test procedure.

With respect to the wear resistance, test pieces as illustrated in FIG. 3, in which the diameter was 30 mm, were prepared, and the test pieces were brought into contact with each other in the state illustrated in FIG. 3 under a contact stress of 1.2 GPa, a slip ratio of −20% (rail material: 600 rpm, wheel material: 750 rpm), and a dry condition. The test lasted for 30 minutes, and the wear resistance was evaluated based on the change in weight before and after the test. The wear resistance was judged to be good when the change in weight was equal to or less than that of the reference steel.

Figure 4:
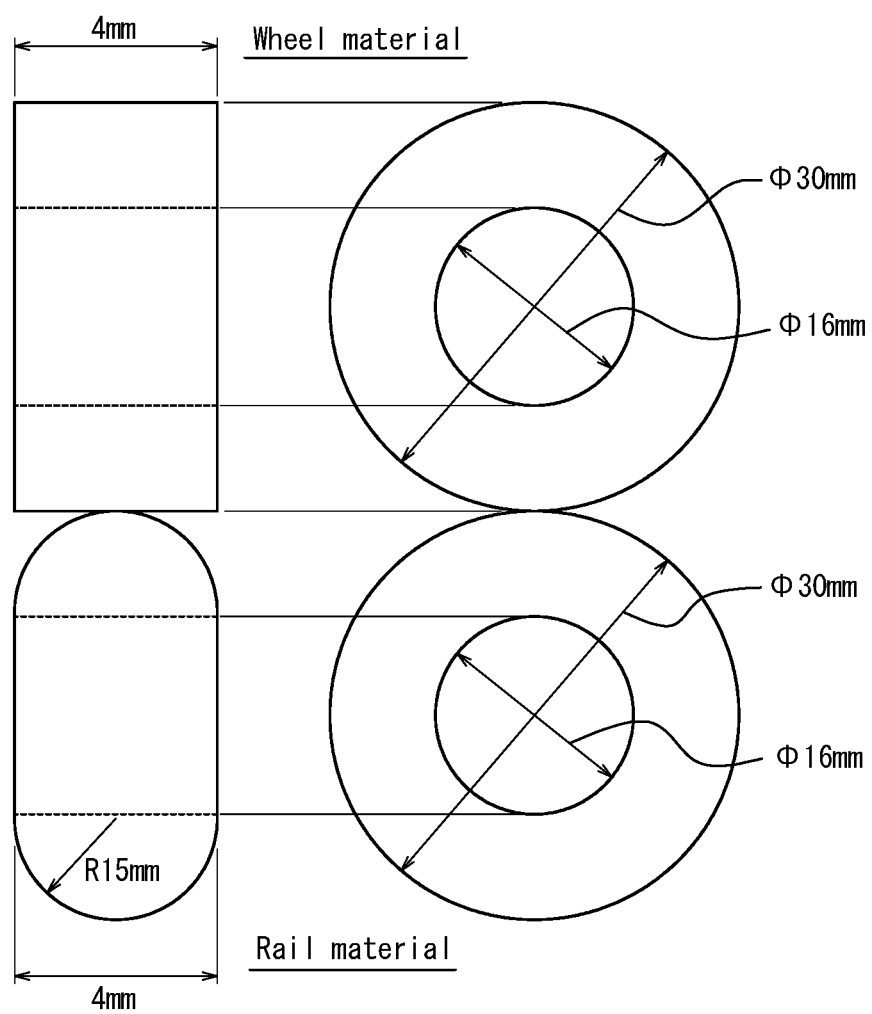
FIG. 4 schematically illustrates a test piece for RCF resistance evaluation and the test procedure.

With respect to the RCF resistance, test pieces as illustrated in FIG. 4, in which the diameter was 30 mm and the contact surface was a curved surface having a curvature radius of 15 mm, were prepared, and the test pieces were brought into contact with each other in the state illustrated in FIG. 4 under a contact stress of 2.2 GPa, a slip ratio of −20% (rail material: 600 rpm, wheel material: 750 rpm) and a lubricated condition. The test was stopped every 9000 rotations, the appearance of the test piece was observed, and the presence or absence of cracks on the contact surface was confirmed through the appearance observation. The test was ended when the occurrence of cracks was observed, and the RCF resistance was evaluated based on the total number of rotations at the end of the test. The RCF resistance was judged to be good when the total number of rotations increased by 10% or more with respect to that of the reference steel.

(Hardness Measurement)

The hardness of the surface layer was measured with the following method.

Figure 5:
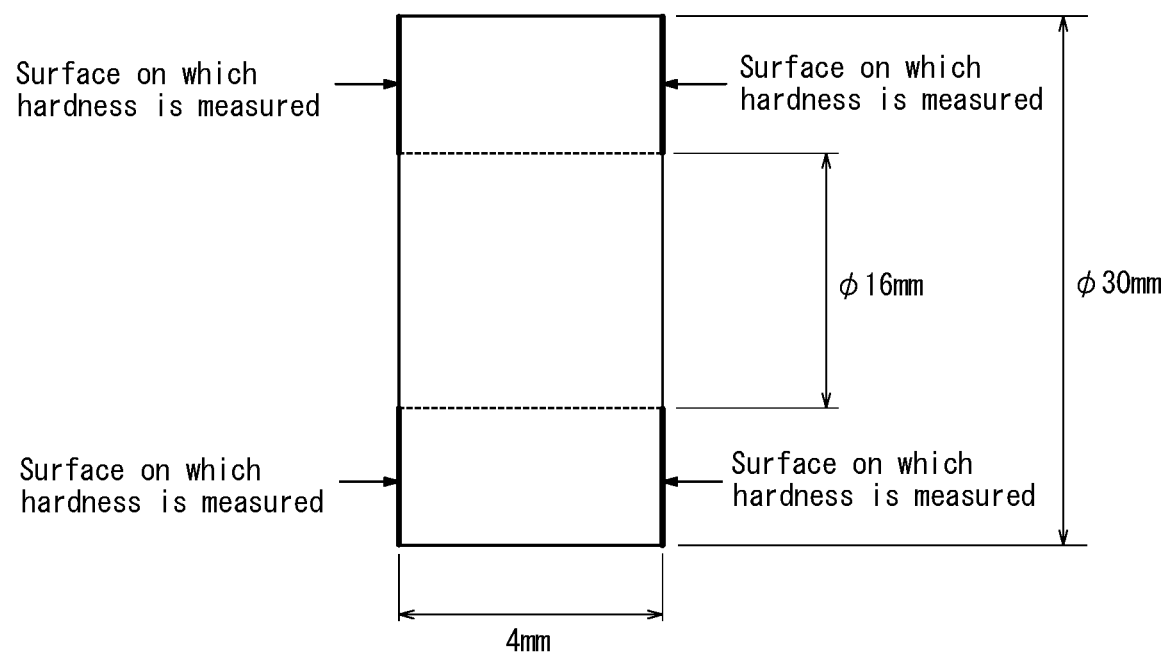
FIG. 5 illustrates a surface on which the hardness is measured of the test piece used in the wear resistance evaluation.

Before subjecting the test piece used in the wear resistance evaluation test illustrated in FIG. 3 to the wear resistance evaluation test, both surfaces of the test piece were etched with a 3% nital solution, and then the structure of the surface on which the hardness was to be measured, as illustrated in FIG. 5, was observed to confirm the surface layer specified in the present disclosure. That is, in the structure observation, the pearlitic structure and the structure other than pearlite could be identified by color tone. Therefore, it was possible to distinguish the surface layer, which had the pearlitic structure and the structure other than pearlite, from portions other than the surface layer. Next, the hardness of the pearlitic structure and the hardness of the structure other than the pearlitic structure were measured at 20 locations respectively with a micro Vickers hardness testing machine (HM-115, Vickers hardness) made by Akashi Corporation under a load of 0.98 N. The maximum and minimum values of the measurement results are listed in Table 3.

(Fraction of Structure)

The aforementioned etched test piece for hardness measurement was photographed by optical microscopy for 20 observation fields in the surface layer having a pearlitic structure and a structure other than pearlite at 100 magnifications. Next, the structures other than the pearlitic structure were traced in the obtained micrograph, the fraction of the structure other than the pearlitic structure was calculated based on the following formula using the image interpretation software Image-Pro (NIPPON ROPPER K.K.), and the average value of the values of all the 20 observation fields was obtained. Fraction of structure other than pearlitic structure={(area of structure other than pearlitic structure)/(area of pearlitic structure+area of structure other than pearlitic structure)}×100

Figure 6:
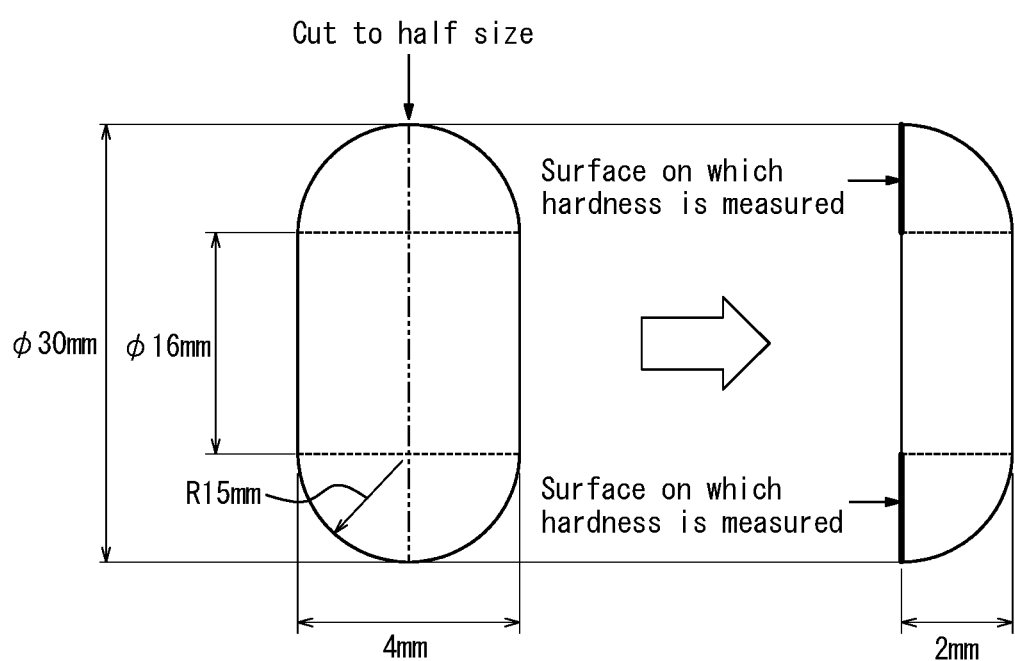
FIG. 6 illustrates a surface on which the hardness is measured of the test piece used in the RCF resistance evaluation.

Further, the test piece used in the RCF resistance evaluation test illustrated in FIG. 4 was cut as illustrated in FIG. 6 after the test, the cut surface was mirror-polished and then etched with a 3% nital solution, and the structure of the surface on which the hardness was to be measured, as illustrated in FIG. 6, was observed to confirm the surface layer specified in the present disclosure. Next, the hardness of the pearlitic structure and the hardness of the structure other than the pearlitic structure were measured at 20 locations respectively with a micro Vickers hardness testing machine (HM-115, Vickers hardness) made by Akashi Corporation under a load of 0.98N. The maximum and minimum values of the measurement results are listed in Table 3.

TABLE 1

| Steel sample ID | Chemical composition (mass %)* | | | | | | Remarks |
| --- | --- | --- | --- | --- | --- | --- | --- |
| | C | Si | Mn | P | S | Cr | |
| A1 | 0.81 | 0.28 | 1.22 | 0.009 | 0.005 | 0.23 | Reference steel |
| A2 | 0.84 | 0.62 | 0.62 | 0.011 | 0.004 | 0.69 | — |

*The balance is Fe and inevitable impurities.

TABLE 2

| | | Heating process | | Cooling process | | | | | | |
| --- | --- | --- | --- | --- | --- | --- | --- | --- | --- | --- |
| Test piece No. | Steel sample ID | Heating temperature (° C.) | Heating holding time (second) | Cooling start temperature (° C.) | First cooling rate (° C./s) | First holding temperature (° C.) | First holding time (second) | Second cooling rate (° C./s) | Second holding temperature (° C.) | Second holding time (second) |
| 1 | A1 | 1250 | 600 | 740 | 5 | 550 | 60 | — | — | — |
| 2 | A2 | 1250 | 600 | 730 | 6 | 550 | 45 | 6 | 450 | 300 |
| 3 | A2 | 1250 | 600 | 770 | 5 | 525 | 45 | 5 | 400 | 350 |
| 4 | A2 | 1250 | 600 | 750 | 7 | 600 | 10 | 3 | 350 | 300 |
| 5 | A2 | 1250 | 600 | 710 | 3 | 600 | 10 | 4 | 400 | 250 |
| 6 | A2 | 1250 | 600 | 720 | 6 | 575 | 30 | 4 | 450 | 250 |
| 7 | A2 | 1250 | 600 | 730 | 4 | 525 | 30 | 7 | 400 | 350 |
| 8 | A2 | 1250 | 600 | 730 | 5 | 550 | 60 | 3 | 425 | 120 |
| 9 | A2 | 1250 | 600 | 750 | 7 | 525 | 60 | 4 | 425 | 350 |
| 10 | A2 | 1250 | 600 | 740 | 10 | 500 | 3 | 3 | 450 | 300 |
| 11 | A2 | 1250 | 600 | 750 | 6 | 675 | 5 | 3 | 450 | 450 |
| 12 | A2 | 1250 | 600 | 750 | 6 | 550 | 45 | 1 | 475 | 200 |
| 13 | A2 | 1250 | 600 | 740 | 5 | 550 | 40 | 7 | 325 | 400 |
| 14 | A2 | 1250 | 600 | 740 | 6 | 650 | 5 | 5 | 400 | 350 |
| 15 | A2 | 1250 | 600 | 730 | 8 | 600 | 20 | 4 | 450 | 300 |
| 16 | A2 | 1250 | 600 | 740 | 8 | 550 | 45 | 3 | 450 | 250 |
| 17 | A2 | 1250 | 600 | 700 | 5 | 600 | 40 | 4 | 350 | 300 |
| 18 | A2 | 1250 | 600 | 715 | 7 | 600 | 25 | 5 | 450 | 150 |

TABLE 3

| | | | Surface layer | | | | | | | | |
| --- | --- | --- | --- | --- | --- | --- | --- | --- | --- | --- | --- |
| Test piece No. | Steel sample ID | Range of depth from surface (mm) | Hardness of pearlitic structure: maximum value (HV) | Hardness of pearlitic structure: minimum value (HV) | Hardness of structure other than pearlitic structure: maximum value (HV) | Hardness of structure other than pearlitic structure: minimum value (HV) | Fraction of structure other than pearlitic structure (%) | Structure other than pearlitic structure | Structure of portions other than surface layer | Amount of wear (g/0.5 h) | Number of rotations until occurrence of cracks | Remarks |
| 1 | A1 | 0.0 | 402 | 390 | — | — | 0.0 | — | Pearlite | 0.31 | 144000 | Reference Example |
| 2 | A2 | 1.0 | 519 | 472 | 387 | 359 | 3.7 | Bainite | Pearlite | 0.26 | 360000 | Example |
| 3 | A2 | 3.0 | 486 | 435 | 401 | 388 | 5.8 | Bainite | Pearlite | 0.27 | 306000 | Example |
| 4 | A2 | 0.5 | 429 | 420 | 420 | 400 | 7.9 | Bainite | Pearlite | 0.30 | 198000 | Example |
| 5 | A2 | 0.5 | 431 | 420 | 403 | 358 | 3.8 | Bainite | Pearlite | 0.31 | 234000 | Example |
| 6 | A2 | 1.3 | 438 | 423 | 366 | 351 | 3.9 | Bainite | Pearlite | 0.31 | 252000 | Example |
| 7 | A2 | 2.0 | 483 | 445 | 409 | 388 | 12.1 | Bainite | Pearlite | 0.28 | 324000 | Example |
| 8 | A2 | 0.9 | 452 | 432 | 375 | 350 | 5.4 | Bainite | Pearlite | 0.29 | 252000 | Example |
| 9 | A2 | 2.8 | 482 | 455 | 388 | 359 | 7.9 | Bainite | Pearlite | 0.28 | 342000 | Example |

TABLE 3-continued

| | | | | | Hardness of structure other than pearlitic structure: maximum value (HV) | Hardness of structure other than pearlitic structure: minimum value (HV) | | | | | | |
|---|---|---|---|---|---|---|---|---|---|---|---|---|
| | | | | | Surface layer | | | | | | | |
| Test piece No. | Steel sample ID | Range of depth from surface (mm) | Hardness of pearlitic structure: maximum value (HV) | Hardness of pearlitic structure: minimum value (HV) | | | Fraction of structure other than pearlitic structure (%) | Structure other than pearlitic structure | Structure of portions other than surface layer | Amount of wear (g/0.5 h) | Number of rotations until occurrence of cracks | Remarks |
| 10 | A2 | 3.0 | 525 | 477 | 354 | 350 | 12.5 | Bainite | Pearlite | 0.25 | 126000 | Comparative Example |
| 11 | A2 | 0.5 | 423 | 415 | 358 | 350 | 3.6 | Bainite | Pearlite | 0.36 | 216000 | Comparative Example |
| 12 | A2 | 1.1 | 465 | 439 | 356 | 345 | 3.6 | Bainite | Pearlite | 0.34 | 270000 | Comparative Example |
| 13 | A2 | 1.2 | 469 | 438 | 424 | 395 | 8.3 | Bainite | Pearlite | 0.30 | 144000 | Comparative Example |
| 14 | A2 | 0.2 | 438 | 422 | 366 | 359 | 2.9 | Bainite | Pearlite | 0.30 | 144000 | Comparative Example |
| 15 | A2 | 0.5 | 433 | 428 | 400 | 359 | 3.0 | Bainite | Pearlite | 0.30 | 162000 | Example |
| 16 | A2 | 0.7 | 449 | 442 | 366 | 353 | 3.2 | Bainite | Pearlite | 0.30 | 180000 | Example |
| 17 | A2 | 0.5 | 432 | 429 | 400 | 360 | 3.1 | Bainite + tempered martensite | Pearlite | 0.29 | 180000 | Example |
| 18 | A2 | 0.5 | 433 | 422 | 364 | 359 | 2.7 | Bainite | Pearlite | 0.26 | 144000 | Example |

In the above example, the test piece No. 1, which was a reference example, was a pearlitic rail steel in current use having a C content of 0.81%. As can be understood from the results listed in Table 3, all the rails of Examples manufactured according to the present disclosure had good RCF resistance as compared with the rail of reference example No. 1, without deteriorating the wear resistance. On the other hand, the Comparative Examples that did not satisfy the conditions of the present disclosure were inferior in at least one of wear resistance and RCF resistance.

Example 2

Test pieces were prepared with the same procedure as in Example 1 except that steel having the chemical composition listed in Table 4 was used, and the hardness, wear resistance and RCF resistance were evaluated in the same manner as in Example 1. The heat treatment conditions are listed in Table 5, and the evaluation results are listed in Table 6.

TABLE 4

| Steel ID sample | Chemical composition (mass %)* | | | | | | | | | | | | | | | | | Remarks |
|---|---|---|---|---|---|---|---|---|---|---|---|---|---|---|---|---|---|---|
| | C | Si | Mn | P | S | Cr | Cu | Ni | Mo | V | Nb | Al | W | B | Ti | Sn | Sb | |
| A1 | 0.81 | 0.28 | 1.22 | 0.009 | 0.005 | 0.23 | — | — | — | — | — | — | — | — | — | — | — | Reference steel |
| B1 | 0.83 | 1.50 | 0.48 | 0.014 | 0.007 | 0.26 | — | — | — | — | — | — | — | — | — | — | — | Conforming steel |
| B2 | 0.83 | 0.25 | 0.85 | 0.005 | 0.007 | 0.61 | — | — | — | — | — | — | — | — | — | — | — | Conforming steel |
| B3 | 0.70 | 0.42 | 0.40 | 0.003 | 0.006 | 1.50 | — | — | — | — | — | — | — | — | — | — | — | Conforming steel |
| B4 | 1.00 | 0.88 | 0.46 | 0.016 | 0.005 | 0.79 | — | — | — | — | — | — | — | — | — | — | — | Conforming steel |
| B5 | 0.83 | 0.25 | 0.62 | 0.003 | 0.006 | 0.26 | — | — | — | — | — | — | — | — | — | — | — | Conforming steel |
| B6 | 0.83 | 0.23 | 1.21 | 0.005 | 0.007 | 0.21 | — | — | — | — | — | — | — | — | — | — | — | Conforming steel |
| B7 | 0.60 | 0.69 | 0.56 | 0.015 | 0.007 | 1.00 | — | — | — | — | — | — | — | — | — | — | — | Conforming steel |
| B8 | 0.71 | 1.16 | 1.34 | 0.016 | 0.004 | 0.88 | — | — | — | — | — | — | — | — | — | — | — | Conforming steel |
| B9 | 0.84 | 1.06 | 0.83 | 0.019 | 0.006 | 0.05 | — | — | — | — | — | — | — | — | — | — | 0.03 | Conforming steel |
| B10 | 0.85 | 0.48 | 0.71 | 0.016 | 0.004 | 0.32 | — | — | — | — | — | — | — | — | — | 0.02 | — | Conforming steel |
| B11 | 0.84 | 0.55 | 0.55 | 0.014 | 0.005 | 0.79 | — | — | — | 0.05 | — | — | — | — | — | — | — | Conforming steel |
| B12 | 0.84 | 0.51 | 0.61 | 0.008 | 0.004 | 0.74 | — | — | — | 0.15 | — | — | — | — | — | — | — | Conforming steel |
| B13 | 0.84 | 0.25 | 1.10 | 0.006 | 0.005 | 0.25 | — | — | — | — | 0.04 | — | — | — | — | — | — | Conforming steel |
| B14 | 0.84 | 0.35 | 1.05 | 0.003 | 0.004 | 0.29 | — | — | 0.30 | — | — | — | — | — | — | — | — | Conforming steel |
| B15 | 0.84 | 0.55 | 0.55 | 0.011 | 0.005 | 0.62 | 0.30 | 0.50 | — | — | — | — | — | — | — | — | — | Conforming steel |
| B16 | 0.84 | 0.25 | 1.21 | 0.004 | 0.005 | 0.29 | — | — | — | — | — | 0.07 | 0.60 | — | — | — | — | Conforming steel |
| B17 | 0.84 | 0.95 | 0.54 | 0.005 | 0.005 | 0.44 | — | — | — | — | — | — | — | 0.003 | 0.05 | — | — | Conforming steel |
| B18 | 0.84 | 0.95 | 0.56 | 0.011 | 0.005 | 0.80 | — | — | — | 0.05 | — | — | — | — | — | — | — | Conforming steel |

*The balance is Fe and inevitable impurities.

TABLE 5

| Test piece No. | Steel sample ID | Heating process | | Cooling process | | | | | | |
|---|---|---|---|---|---|---|---|---|---|---|
| | | Heating temperature (° C.) | Heating holding time (second) | Cooling start temperature (° C.) | First cooling rate (° C./s) | First holding temperature (° C.) | First holding time (second) | Second cooling rate (° C./s) | Second holding temperature (° C.) | Second holding time (second) |
| 1 | A1 | 1250 | 600 | 740 | 5 | 550 | 60 | — | — | — |
| 2 | B1 | 1250 | 600 | 730 | 7 | 520 | 45 | 5 | 450 | 300 |
| 3 | B2 | 1250 | 600 | 750 | 7 | 520 | 45 | 5 | 400 | 400 |
| 4 | B3 | 1250 | 600 | 710 | 8 | 520 | 45 | 6 | 425 | 375 |
| 5 | B4 | 1250 | 600 | 710 | 7 | 520 | 45 | 6 | 425 | 375 |
| 6 | B5 | 1250 | 600 | 720 | 6 | 520 | 45 | 5 | 400 | 400 |
| 7 | B6 | 1250 | 600 | 730 | 6 | 520 | 45 | 5 | 450 | 300 |
| 8 | B7 | 1250 | 600 | 720 | 6 | 520 | 45 | 5 | 450 | 300 |
| 9 | B8 | 1250 | 600 | 740 | 8 | 520 | 45 | 7 | 425 | 350 |
| 10 | B9 | 1250 | 600 | 750 | 7 | 520 | 45 | 7 | 425 | 350 |
| 11 | B10 | 1250 | 600 | 730 | 7 | 520 | 45 | 6 | 425 | 350 |
| 12 | B11 | 1250 | 600 | 720 | 7 | 520 | 45 | 3 | 450 | 300 |
| 13 | B12 | 1250 | 600 | 750 | 8 | 520 | 45 | 4 | 460 | 300 |
| 14 | B13 | 1250 | 600 | 760 | 8 | 520 | 45 | 4 | 425 | 350 |
| 15 | B14 | 1250 | 600 | 800 | 5 | 520 | 45 | 5 | 450 | 300 |
| 16 | B15 | 1250 | 600 | 790 | 6 | 520 | 45 | 5 | 460 | 300 |
| 17 | B16 | 1250 | 600 | 740 | 6 | 520 | 45 | 5 | 460 | 300 |
| 18 | B17 | 1250 | 600 | 770 | 6 | 520 | 45 | 4 | 440 | 300 |
| 19 | B18 | 1250 | 600 | 780 | 5 | 520 | 45 | 4 | 450 | 300 |

TABLE 6

| Test piece No. | Steel sample ID | Surface layer | | | | | | | | | | |
|---|---|---|---|---|---|---|---|---|---|---|---|---|
| | | Range of depth from surface (mm) | Hardness of pearlitic structure: maximum value (HV) | Hardness of pearlitic structure: minimum value (HV) | Hardness of structure other than pearlitic structure: maximum value (HV) | Hardness of structure other than pearlitic structure: minimum value (HV) | Fraction of structure other than pearlitic structure (%) | Structure other than pearlitic structure | Structure of portions other than surface layer | Amount of wear (g/0.5 h) | Number of rotations until occurrence of cracks | Remarks |
| 1 | A1 | 0.0 | 402 | 390 | — | — | 0.0 | — | Pearlite | 0.31 | 144000 | Reference Example |
| 2 | B1 | 0.5 | 520 | 488 | 382 | 366 | 3.5 | Bainite | Pearlite | 0.27 | 360000 | Example |
| 3 | B2 | 0.8 | 435 | 420 | 419 | 392 | 4.1 | Bainite | Pearlite | 0.29 | 234000 | Example |
| 4 | B3 | 0.7 | 429 | 421 | 408 | 388 | 4.2 | Bainite | Pearlite | 0.29 | 252000 | Example |
| 5 | B4 | 1.1 | 518 | 487 | 401 | 376 | 4.1 | Bainite | Pearlite | 0.26 | 342000 | Example |
| 6 | B5 | 0.5 | 438 | 421 | 411 | 377 | 4.2 | Bainite | Pearlite | 0.29 | 252000 | Example |
| 7 | B6 | 0.7 | 442 | 429 | 364 | 350 | 4.1 | Bainite | Pearlite | 0.30 | 288000 | Example |
| 8 | B7 | 0.5 | 432 | 420 | 389 | 367 | 4.2 | Bainite | Pearlite | 0.31 | 270000 | Example |
| 9 | B8 | 2.5 | 434 | 422 | 388 | 366 | 3.9 | Bainite | Pearlite | 0.30 | 279000 | Example |
| 10 | B9 | 0.6 | 449 | 432 | 367 | 354 | 3.8 | Bainite | Pearlite | 0.30 | 288000 | Example |
| 11 | B10 | 0.8 | 441 | 429 | 371 | 364 | 3.9 | Bainite | Pearlite | 0.30 | 279000 | Example |
| 12 | B11 | 1.0 | 456 | 448 | 358 | 350 | 4.0 | Bainite | Pearlite | 0.29 | 324000 | Example |
| 13 | B12 | 1.2 | 462 | 442 | 357 | 350 | 4.1 | Bainite | Pearlite | 0.29 | 333000 | Example |
| 14 | B13 | 1.0 | 428 | 420 | 374 | 366 | 4.2 | Bainite | Pearlite | 0.31 | 270000 | Example |
| 15 | B14 | 0.9 | 439 | 428 | 365 | 354 | 4.1 | Bainite | Pearlite | 0.30 | 288000 | Example |
| 16 | B15 | 0.9 | 457 | 443 | 362 | 356 | 3.7 | Bainite | Pearlite | 0.29 | 297000 | Example |
| 17 | B16 | 1.0 | 463 | 443 | 362 | 351 | 4.0 | Bainite | Pearlite | 0.29 | 306000 | Example |
| 18 | B17 | 0.8 | 476 | 448 | 377 | 368 | 4.1 | Bainite | Pearlite | 0.29 | 315000 | Example |
| 19 | B18 | 1.8 | 489 | 465 | 392 | 377 | 4.2 | Bainite | Pearlite | 0.27 | 306000 | Example |

As can be understood from the results listed in Table 6, all the rails satisfying the conditions of the present disclosure had improved RCF resistance as compared with the rail of the test piece No. 1, which was the reference example, without deteriorating the wear resistance.

The invention claimed is:

1. A rail comprising a metallic structure including a pearlitic structure and a structure other than the pearlitic structure in a surface layer from a surface of a rail head to a depth of at least 0.5 mm and 3 mm or less, wherein the pearlitic structure has Vickers hardness of 420 HV or more and 520 HV or less,
the structure other than the pearlitic structure has Vickers hardness of 350 HV or more and 420 HV or less, and
an area fraction of the structure other than the pearlitic structure in the surface layer is more than 3% and 12.1% or less.

2. The rail according to claim 1, comprising a chemical composition containing, in mass %:
C: 0.60% to 1.00%,
Si: 0.10% to 1.50%, Mn: 0.10% to 1.50%,
P: 0.025% or less,
S: 0.010% or less, and
Cr: 0.10% to 1.50%,
the balance being Fe and inevitable impurities.

3. The rail according to claim 2, wherein the chemical composition further contains, in mass %, at least one selected from the group consisting of:
V: 0.30% or less,
Cu: 1.0% or less,
Ni: 1.0% or less,
Nb: 0.05% or less,
Mo: 0.5% or less,
Al: 0.07% or less,
W: 1.0% or less,
Sb: 0.1% or less,
Sn: 0.1% or less,
B: 0.005% or less, and
Ti: 0.05% or less.

* * * * *